(No Model.)
J. F. MUNSIE.
INSULATOR.
No. 426,198. Patented Apr. 22, 1890.
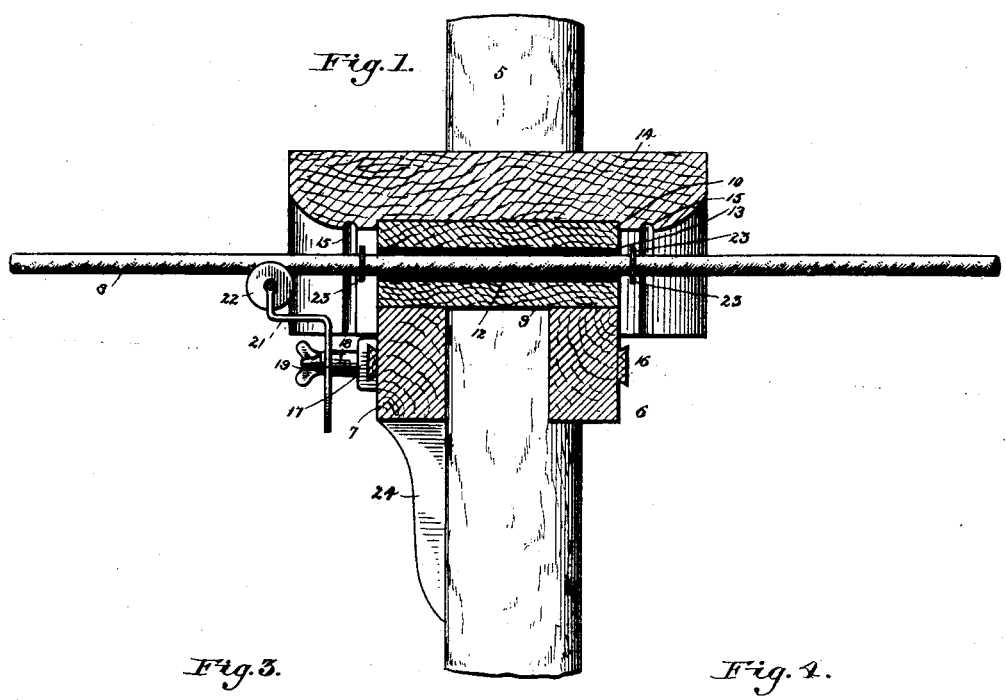
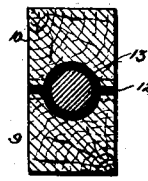
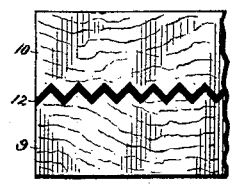
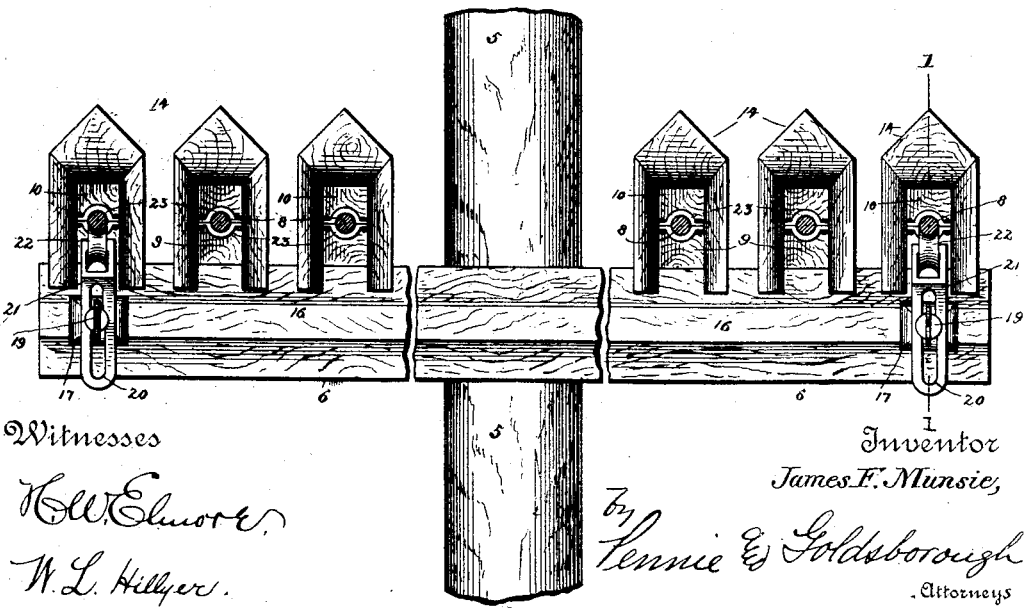
Witnesses
H. W. Elmore
W. L. Hillyer.
Inventor
James F. Munsie,
by Lennie & Goldsborough
Attorneys

UNITED STATES PATENT OFFICE.

JAMES F. MUNSIE, OF BROOKLYN, NEW YORK, ASSIGNOR TO THOMAS LEONARD COLES, OF SAME PLACE.

INSULATOR.

SPECIFICATION forming part of Letters Patent No. 426,198, dated April 22, 1890.

Application filed October 29, 1889. Serial No. 328,594. (No model.)

*To all whom it may concern:*

Be it known that I, JAMES F. MUNSIE, a subject of the Queen of England, residing at Brooklyn, in the county of Kings and State of New York, have invented certain new and useful Improvements in Overhead or Air-Line Systems of Electrical Conductors; and I do hereby declare the following to be a full, clear, and exact description of the invention, such as will enable others skilled in the art to which it appertains to make and use the same.

My invention relates to certain new and useful improvements in overhead or air-line systems of electrical conductors, and more especially to improved means for protecting the insulating-covering of high-tension wires at the point where said wires are connected to the cross-arms of the carrying poles or standards from abrasion and from access of moisture, thereby effectually guarding against the danger incident to leakage of current at such points to neighboring "dead" wires or low-tension wires imperiling life and property.
In carrying out my invention my main object has been, first, to dispense with twists or turns in the wire at the point of connection with the cross-arm, which twists or turns tend to impair or destroy the adhesion of the insulating-covering to the wire; secondly, to prevent said insulating-covering from coming in contact at the point of connection with any hard abrading surface by supporting or cushioning the covering upon a clamping-bed of soft rubber, tar-yarn, or the like, which will protect the covering from injury under all strains met with in practice, and, thirdly, to protect the point of connection both from direct access of moisture from above and to direct to the ground all moisture flowing toward it from the line.

In the accompanying drawings, illustrative of the invention, Figure 1 represents a longitudinal section of a device embodying the same, said section being taken on a plane indicated by the line 1 1 of Fig. 2. Fig. 2 represents a front elevation of the same. Fig. 3 represents a cross-section of a detail; and Fig. 4 represents a side elevation, partly broken away, of the latter.

Similar numerals of reference indicate similar parts throughout the several views.

Referring to the drawings, 5 indicates a pole or standard of the ordinary kind adapted for supporting wires and provided with the usual cross-arms, as 6, secured within transverse gains or recesses in the customary manner, as shown. In juxtaposition to the said cross-arms I secure upon the opposite side of the pole additional cross-arms, as 7, supported upon suitable brackets, as 24, provided for the purpose. The cross-arms 6 7 as thus arranged serve as supports for the devices to which the conducting-wires, as 8, are to be connected. These devices consist, primarily, of two longitudinally grooved or recessed sections 9 10, fitting one over the other and surmounted by the cap-piece 14. The bottom section 9 is lined with a covering or layer of soft or yielding material, such as soft rubber, tar-yarn, or the like. I preferably provide for the purpose a layer of soft rubber 12, which may be conveniently molded in the trough form shown, having overlapping flanges resting upon the upper edges of the said bottom section 9; or it may consist merely of a sheet of rubber bent in like manner. A corresponding lining 13 (but devoid of side flanges) is provided for the upper section 10. The thickness of the soft rubber or tar-yarn linings of both upper and lower sections is so proportioned to the diameter of the electrical conductor passing between them that when the sections are brought together they will firmly and securely grasp the conductor with an intimate contact throughout the sections. This grasping or clamping action is attained by means of the cap-piece 14, which fits over the upper section 10, a suitable recess for that purpose being provided in the under side of the cap-piece. As the upper section is forced down upon the conductor resting within the lower section, the toothed or serrated edges of the two sections are forced into the rubber flange between them, and as said serrations are so spaced as to interlock they provide an efficient safeguard against tendency of the conductor, when heavily laden from sleet or ice, to pull out said lining from between the sections.

The cap-pieces 14 are preferably spaced at some slight distance apart and are provided with peaked roofs, so as to readily shed the rain or snow, and are connected to the cross-pieces by screws or otherwise, so as to be readily removable. At their ends they are bell-mouthed or flaring, as shown, so as to be as far removed as possible from the conductor while still overhanging the ends of the sections. This construction enables them to protect sections 9 10 from moisture, and at the same time the conductor itself, if swayed by the wind, will not touch said cap-piece and thus gather moisture from it.

At the rear of the flaring mouth-piece I provide grooves or recesses 15, whose function is to arrest any drippings or condensations that may in severe weather flow in along the flaring sides and direct said drippings to the ground.

Immediately in the rear of the grooves or recesses 15, I clamp upon the conductor a releasable ring 23. Drops of rain advancing along the conductor toward the sections 9 10 are intercepted by said ring and drip to the ground. Rings of this character will be found of especial importance in maintaining the sections 9 10 free from moisture in those instances where the conductor in question passes from a lower cross-arm on one pole to a higher cross-arm on an adjacent pole. Even on horizontal wires, however, they will be of advantage, inasmuch as the wind frequently drives the rain-drops along the conductors toward the cross-arms.

Upon the cross-arms 6 7, I may secure horizontal guide-rails 16, which in connection with friction-roller devices serve to lessen the wear upon the insulating-covering of the conductor while the same is being strung upon the poles. The said friction-roller devices consist, preferably, of a casting 17, having guides adapted to slide freely upon the guide-rail 16, and having a screw-threaded recess 18 for the reception of a butterfly-screw 19. The butterfly-screw 19 passes through a slot 20 of the vertically-adjustable bent arm 21, which said arm carries at its upper end the loosely-turning friction-roller 22.

In using the friction-roller devices in putting up the conducting-wires the lineman at the cross-arms adjusts the bent arm 21 by means of the slot 20 and butterfly-screw 19, so as to bring the friction-roller 22 to a position such that its groove will be somewhat above the opening between the sections 9 10, within which the conductor is to lie. The linemen assisting him will thereupon draw upon the free end of the conductor, thereby drawing the conductor taut. As the conductor rests within the groove of the raised friction-roller during this drawing or tightening operation and upon the upper surface of said groove, the covering will be protected from injury and the conductor will not be drawn along in contact with the lining of the section 9 so as to injure the latter. As soon as the conductor is drawn taut the roller is lowered by loosening the butterfly-screw 19, whereupon the conductor settles into the trough-like lining 12 of the lower section 9. The upper section 10 is then applied over the conductor, together with the cap-piece 14, and the latter is then secured to the cross-arms by means of screws or the like, thereby forcing the upper section down upon the lower one and clamping the conductor firmly between the linings 12 and 13 with an extended bearing-surface. The ring-disks 23 are then secured upon the conductor, thereby completing the work for that particular connection.

It will be evident that the work of putting up an air-line in accordance with my invention can be proceeded with rapidly and effectively, while at the same time the entire system is readily accessible for removal and repair, as occasion may require. The first cost is, moreover, moderate, as the system can be conveniently applied to the existing styles of poles in the manner shown.

I do not wish to be understood as restricting myself to the exact construction and arrangement of parts shown and described, as I contemplate in some instances such modifications thereof as circumstances may require and as will fairly fall within the limits of my invention.

Having thus described my invention, what I claim is—

1. In an overhead or air-line system of electrical conductors, the combination, with the pole or standard and its cross-arms, of clamping devices for the conductors, secured to said cross-arms and consisting of two parts or sections having serrated edges and lined with a soft yielding material, said material having side flanges resting between the said serrated edges, substantially as described.

2. In an overhead or air-line system of electrical conductors, the combination, with the pole or standard and its cross-arms, of clamping devices for the conductors, secured to said cross-arms and consisting of two parts or sections having serrated edges and lined with a soft yielding material, said material having side flanges resting between the said serrated edges, and a compressing cap-piece having a recess for the reception of the upper section, substantially as described.

3. In an overhead or air-line system of electrical conductors, the combination, with the pole or standard and its cross-arms, of clamping devices for the conductors, secured to said cross-arms and provided with a lining of soft yielding material, and a compressing cap-piece having flaring or bell-shaped ends overlapping the clamping devices, substantially as described.

4. In an overhead or air-line system of electrical conductors, the combination, with the pole or standard and its cross-arms, of clamping devices for the conductors, secured to said cross-arms and provided with a lining of soft yielding material, and a compressing cap-piece having flaring or bell-shaped ends overlapping the clamping devices and drip-grooves at the rear of said flaring ends, substantially as described.

5. In an overhead or air-line system of electrical conductors, the combination, with the pole or standard and its cross-arms, of clamping devices for the conductors, secured to said cross-arms and provided with a lining of soft yielding material, and a compressing cap-piece having flaring or bell-shaped ends overlapping the clamping devices and drip-grooves at the rear of said flaring ends, and ring-disks attached to the conductor at the rear of the drip-grooves, substantially as described.

6. The combination, with the insulator of an overhead conductor, of a ring disk attached to the conductor in advance of the insulator, to protect the latter from moisture, advancing along the conductor, substantially as described.

7. The combination, with the supporting pole or standard having cross-arms 6 7 secured to opposite sides thereof, of the series of insulator-connections spanning said cross-arms, and the peak-roofed cap-pieces for said insulator connections, said cap-pieces being separated from each other by intervening spaces, substantially as described.

In testimony whereof I affix my signature in presence of two witnesses.

JAMES F. MUNSIE.

Witnesses:
JOHN C. PENNIE,
D. G. STUART.